United States Patent [19]
Sano

[11] Patent Number: 6,136,906
[45] Date of Patent: Oct. 24, 2000

[54] SOLID GOLF BALL

[75] Inventor: Yoshinori Sano, Fukuchiyama, Japan

[73] Assignee: Sumitomo Rubber Industries, Ltd., Hyogo-ken, Japan

[21] Appl. No.: 09/132,678

[22] Filed: Aug. 12, 1998

[30] Foreign Application Priority Data

Aug. 12, 1997 [JP] Japan .................................... 9-231723

[51] Int. Cl.[7] ................................ A63B 37/06; C08L 9/00
[52] U.S. Cl. .......................... 524/399; 525/274; 473/372
[58] Field of Search ........................... 525/274; 473/372; 524/399

[56] References Cited

U.S. PATENT DOCUMENTS 4,561,657  12/1985  Tominaga .

FOREIGN PATENT DOCUMENTS

| 141961 | 8/1984 | Japan . |
|---|---|---|
| 92781 | 5/1985 | Japan . |
| 94782 | 4/1991 | Japan . |
| 196661 | 8/1996 | Japan . |
| 2134800 | 8/1984 | United Kingdom . |

*Primary Examiner*—David J. Buttner
*Attorney, Agent, or Firm*—Birch, Stewart, Kolasch & Birch, LLP

[57] ABSTRACT

The present invention provides a solid golf ball having excellent rebound characteristics and excellent durability. The present invention relates to a solid golf ball comprising a core and a cover formed on the core, the core being obtained by vulcanizing and molding a rubber composition, wherein the rubber composition contains as co-crosslinking agent zinc acrylate having a particle size distribution of 0.1 to 5 $\mu$m and an average particle size of 1 to 4.5 $\mu$m.

8 Claims, 1 Drawing Sheet

SOLID GOLF BALL

FIELD OF THE INVENTION

The present invention relates to a solid golf ball. More particularly, it relates to a solid golf ball comprising a core and a cover formed on the core.

BACKGROUND OF THE INVENTION

A core used for a solid golf ball is generally obtained by vulcanizing and press-molding a rubber composition. The rubber composition generally comprises polybutadiene, a metal salt of unsaturated carboxylic acid as a co-crosslinking agent, zinc oxide as a weight adjusting agent, dicumyl peroxide as a vulcanization initiator and the like.

In the rubber composition for the core, the metal salt of unsaturated carboxylic acid is grafted to a main chain of polybutadiene by the action of the vulcanization initiator, such as dicumyl peroxide, and therefore is functioned a co-crosslinking agent. Any type of metal salt of unsaturated carboxylic acid can be used as the co-crosslinking agent, but zinc acrylate is most generally used.

Since the zinc acrylate is contained in a very large amount, for example 10 to 60 parts by weight based on 100 parts by weight of rubber component, in one-piece solid golf balls or in the core of two-piece solid golf balls, dispersibility and reactivity of zinc acrylate in the rubber composition have great effect on the physical properties of the solid golf balls.

Japanese Patent Kokai Publication No. 141961/1984 suggests that a surface of zinc acrylate particle is coated with a higher fatty acid in order to improve the dispersibility of zinc acrylate in the rubber composition. Japanese Patent Kokai Publication No. 92781/1985 also suggests that a surface of zinc acrylate particle is coated with a metal salt of higher fatty acid to improve the dispersibility of zinc acrylate in the rubber composition. In addition, Japanese Patent Kokai Publication No. 94782/1991 suggests that a mixture of a liquid polymer and a metal salt of unsaturated fatty acid is used as a co-crosslinking agent so as to improve the dispersibility of the metal salt of unsaturated fatty acid in the rubber composition.

The improvements which have been conducted until now are all concerned with the enhancement of dispersibility of zinc acrylate in the rubber composition by way of coating the surface of zinc acrylate particle or dispersing zinc acrylate in a liquid polymer. However, no one has attempted to study effect of particle size distribution of zinc acrylate on physical properties of golf balls.

The present inventors have studied the effect of particle size distribution of zinc acrylate and have found that the zinc acrylate which has been employ shows large particle size distribution, e.g. from 5 to 25 μm, which creates uniformity of reactivity when crosslinking and gives unevenness of compression and hardness, thus deteriorating rebound characteristics and durability.

OBJECTS OF THE INVENTION

A main object of the present invention is to provide a solid golf ball having little unevenness in compression and hardness, and exhibiting excellent rebound characteristics and excellent durability.

According to the present invention, the object described above has been accomplished by making uniform the reactivity of zinc acrylate during vulcanization, thus providing a solid golf ball having little unevenness in compression and hardness, and exhibiting excellent rebound characteristics and excellent durability.

SUMMARY OF THE INVENTION

Figure 1:
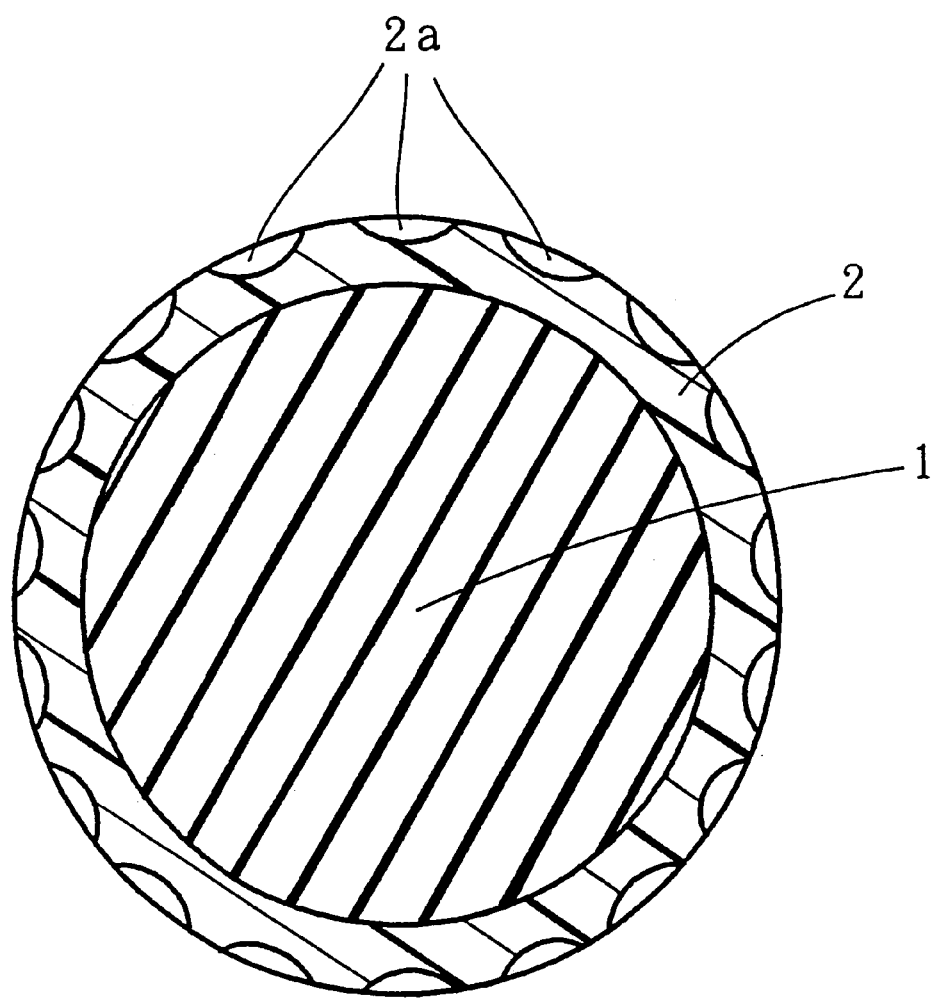
FIG. 1 is a schematic cross section illustrating one embodiment of the golf ball of the present invention.

The present invention provides a solid golf ball comprising a core and a cover formed on the core, the core being obtained by vulcanizing and molding a rubber composition, wherein the rubber composition contains as co-crosslinking agent zinc acrylate having a particle size distribution of 0.1 to 5 μm and an average particle size of 1 to 4.5 μm.

DETAILED DESCRIPTION OF THE INVENTION

In the present invention, it is required that zinc acrylate as a co-crosslinking agent has a particle size distribution of 0.1 to 5 μm, preferably 0.5 to 5 μm. When the particle size of zinc acrylate is smaller than 0.1 μm, zinc acrylate particles cause secondary agglomeration when mixing with a rubber component, and thus it is difficult to accomplish appropriate dispersibility in the rubber composition. On the other hand, when the particle size of zinc acrylate is larger than 5 μm, it is difficult to closely disperse zinc acrylate particles in the rubber composition. Therefore, in the both cases, the reactivity of zinc acrylate is not uniform and the compression and hardness of the resulting golf ball show unevenness, thus degrading the rebound characteristics and durability of the resulting golf ball. In the present invention, the particle size of zinc acrylate is determined by a centrifugally operated automatic particle size analyzer, for example, Type GAPA-700 available from HORIBA SEISAKUSYO Co., Ltd.

It is also required that the zinc acrylate used in the present invention has an average particle size of 1 to 4.5 μm, preferably 2 to 4 μm. When the average particle size of zinc acrylate is smaller than 1 μm, zinc acrylate particles cause secondary agglomeration when mixing with a rubber component, and thus the dispersibility of zinc acrylate particle in the rubber composition is not uniform. On the other hand, when the average particle size of zinc acrylate is larger than 4.5 μm, it is difficult to closely disperse zinc acrylate particle in the rubber composition when mixing with a rubber component. In the present invention, the average particle size of zinc acrylate is also determined by the centrifugally operated automatic particle size analyzer explained above.

A method of preparing the zinc acrylate used in the present invention will be explained hereinafter. The zinc acrylate can be obtained by emulsifying a zinc compound in a reaction solvent such as toluene, xylene, benzene and the like, adding acrylic acid thereto, and reacting the acrylic acid with the zinc compound with stirring using an equipment having stirring function, such as a kneader, a Banbury mixer and the like. The zinc compound may include zinc oxide, zinc hydroxide, zinc carbonate, zinc bicarbonate and the like, but zinc oxide is preferable.

The reaction time and reaction temperature are not limited in the above reaction, but the reaction temperature is preferably 20 to 90° C., and the reaction time is preferably 20 minutes to 6 hours. A mole ratio of the zinc compound (expressed as zinc) to acrylic acid is 90 to 100, preferably 94 to 98, based on 100 of acrylic acid.

In the reaction of the zinc compound with acrylic acid, it is preferable to add a metal salt of higher fatty acid to improve dispersibility of zinc acrylate by coating a surface of zinc acrylate particle with the metal salt of higher fatty acid.

For the above mentioned metal salt of higher fatty acid, the higher fatty acid may preferably be fatty acid having 12 to 30 of carbon atoms. Preferred is stearic acid. The metal includes zinc, magnesium, copper, iron and the like. Preferred is zinc. The metal salt of higher fatty acid may be added intact, or by dissolving in an organic solvent used during the reaction of zinc compound with acrylic acid. The metal salt of higher fatty acid is preferably added after the reaction. An amount of the metal salt of higher fatty acid is not limited, but is preferably 3 to 15 parts by weight based on 100 parts by weight of acrylic acid. The resulting zinc acrylate may be mechanically ground using a grinder to make the particle size distribution narrower by controlling a grinding time. The grinding time can vary depending to the type or ability of the grinder, and it is not limited, but is preferably 20 to 60 minutes.

The rubber composition for cores used in the present invention is not limited as long as zinc acrylate having a particle size distribution of 0.1 to 5 $\mu$m and an average particle size of 1 to 4.5 $\mu$m is used as a co-crosslinking agent for the rubber composition, but preferably contains a rubber component, the above specified zinc acrylate, a weight adjusting agent, a vulcanization initiator and the like.

Examples of the rubber components are polybutadiene or one mainly containing polybutadiene. Examples of the weight adjusting agents are zinc oxide, barium sulfate, calcium carbonate and the like. Examples of the vulcanization initiators are dicumyl peroxide and the like.

An amount of each component is also not limited, but it is preferable to contain 10 to 60 parts by weight of the specified zinc acrylate as a co-crosslinking agent, 10 to 30 parts by weight of the weight adjusting agent, 0.5 to 5 parts by weight of the vulcanization initiator, based on 100 parts by weight of the rubber component. The rubber composition for the core may optionally contain an antioxidant, a rubber powder and the like.

In the preparation of the core, the vulcanization of the rubber composition is not limited, but may be conducted by press-molding the rubber composition at 130 to 170° C. for 10 to 50 minutes. The press-molding may be conducted two or more stages.

Hereinafter, the golf ball of the present invention will be explained with reference to the accompanying drawing. FIG. 1 is a schematic cross section illustrating one embodiment of the golf ball of the present invention. The golf ball in FIG. 1 is a two-piece solid golf ball comprising a core 1 made of a vulcanized molded article of the rubber composition and a cover 2 formed on the core. The core 1 is formed from a vulcanized molded article of the rubber composition containing zinc acrylate having a particle size distribution of 0.1 to 5 $\mu$m and an average particle size of 1 to 4.5 $\mu$m as a co-crosslinking agent for the rubber composition. The cover 2 is not limited, but it may be a resin cover mainly composed of ionomer resin or balata cover. Dimples 2a are provided on the surface of the cover 2. The dimples 2a are provided optionally or according to the desired characteristics to the cover 2 of the golf ball in a suitable number and form, then, paint finishing or marking may be optionally conducted on the golf ball. Although one embodiment of the solid golf ball of the present invention is described in FIG. 1, it is not limited thereto. The cover may have single layer structure or multi-layer structure which has two or more layers, or an intermediate layer may be provided between the core and cover.

EXAMPLES

The following Examples and Comparative Examples further illustrate the present invention in detail but are not to be construed to limit the scope of the present invention.

Preparation of zinc acrylate

Forty-eight parts by weight of zinc oxide and 160 parts by weight of toluene were mixed with stirring in a kneader, to which 100 parts by weight of acrylic acid was added to react at 30° C. for 60 minutes. To the content, 10 parts by weight of zinc stearate was added and mixed at 50° C. for 30 minutes to obtain a slurry product. The product was heated at 50° C. under a vacuum condition of 80 mm Hg to distill off toluene, and zinc acrylate was obtained.

The resulting zinc acrylate was ground using a grinder at the conditions shown in Table 1 and Table 2 to obtain five sorts of zinc acrylates having different particle size distribution and average particle size. The particle size distribution and average particle size were determined by a centrifugally operated automatic particle size analyzer.

TABLE 1

| Preparation No. | 1 | 2 |
|---|---|---|
| Grinding time (minutes) | 30 | 40 |
| Particle size distribution ($\mu$m) | 0.5 to 5 | 0.5 to 3.5 |
| Average particle size ($\mu$m) | 3.0 | 1.8 |

TABLE 2

| Comparative Preparation No. | 1 | 2 | 3 |
|---|---|---|---|
| Grinding time (minutes) | 75 | 15 | 0 |
| Particle size distribution ($\mu$m) | 0.05 to 1.5 | 2 to 15 | 5 to 25 |
| Average particle size ($\mu$m) | 1.1 | 4.3 | 9.5 |

Examples 1 to 2 and Comparative Examples 1 to 3

Production of cores

A rubber composition for core was prepared by mixing the ingredients of the formulation shown in the following Table 3. In table 3, the numbers showing amounts of each material is based on part by weight, and the zinc acrylate was selected from Preparation Nos. 1 to 2 shown in Table 1 or Comparative Preparation Nos. 1 to 3 shown in Table 2. The resulting rubber composition was vulcanized and press-molded at 160° C. for 25 minutes to obtain solid cores having an average diameter of 38.5 mm.

A compression and hardness of the resulting core were measured for every 12 samples, the variability thereof were shown in Table 3 as the range from the minimum value to the maximum value.

The compression was determined by measuring a deformation amount when applying from an initial load of 10 kgf to a final load of 130 kgf on the core, the hardness was measured by a JIS-C hardness meter.

TABLE 3

|  | Example | | Comparative Example | | |
|---|---|---|---|---|---|
| Core composition | 1 | 2 | 1 | 2 | 3 |
| Polybutadiene *1 | 100 | 100 | 100 | 100 | 100 |
| Zinc acrylate Preparation | | | | | |
| No. 1 | 36 | 0 | 0 | 0 | 0 |
| No. 2 | 0 | 36 | 0 | 0 | 0 |
| Comp. Preparation ** | | | | | |
| No. 1 | 0 | 0 | 36 | 0 | 0 |
| No. 2 | 0 | 0 | 0 | 36 | 0 |
| No. 3 | 0 | 0 | 0 | 0 | 36 |
| Zinc oxide | 20 | 20 | 20 | 20 | 20 |
| Dicumyl peroxide | 1.2 | 1.2 | 1.2 | 1.2 | 1.2 |
| Antioxidant *2 | 0.5 | 0.5 | 0.5 | 0.5 | 0.5 |
| Compression (mm) | | | | | |
| Maximum value | 3.70 | 3.65 | 3.50 | 3.65 | 3.55 |
| Minimum value | 3.90 | 3.80 | 4.05 | 4.00 | 4.05 |
| Hardness (JIS-C) | | | | | |
| Maximum value | 80 | 80.5 | 73 | 78 | 78.5 |
| Minimum value | 81 | 81.5 | 78 | 81.5 | 82 |

*1: Polybutadiene (trade name "BR-11") available from JSR Co., Ltd.
*2: Antioxidant (trade name "Yoshinox 425") available from Yoshitomi Pharmaceutical Inds., Ltd.
**: Comparative Preparation As described in Table 3, the cores of Examples 1 to 2 have a compression and hardness of more narrow range from the minimum value to the maximum value, and thus have a compression and hardness of smaller variability, in comparison with the cores of Comparative Examples 1 to 3. In other words, the cores of Examples 1 to 2 vulcanized with zinc acrylates of Preparation 1 to 2 having a particle size distribution of 0.1 to 5 μm and an average particle size of 1 to 4.5 μm as described in Table 1 have a compression and hardness of more narrow range from the minimum value to the maximum value, and thus have a compression and hardness of smaller variability, in comparison with the cores of Comparative Examples 1 to 3 vulcanized with zinc acrylates of Comparative Preparation 1 to 3 which one or both of a particle size distribution and average particle size are out of the range.

Production of golf balls

A cover layer was formed by directly injection molding an ionomer resin cover composition on the resulting core to produce a two-piece golf ball having a diameter of 42.7 mm. The cover composition was formed from 50:50 mixture of Hi-milan 1605 (trade name) and Hi-milan 1706 containing 2 parts by weight of titanium dioxide based on 100 parts by weight of the mixture. "Hi-milan" is the trade name of ionomer resin manufactured by Mitsui Du Pont Polychemical Co., Ltd., and Hi-milan 1605 is the trade name of ethylene-methacrylic acid copolymer ionomer resin obtained by neutralizing with sodium ion, and Hi-milan 1706 is the trade name of ethylene-methacrylic acid copolymer ionomer resin obtained by neutralizing with zinc ion.

The ball weight, ball compression, coefficient of restitution and durability of the resulting golf balls were determined and evaluated. The results are shown in Table 4. The ball compression was measured by the PGA method. The test methods of coefficient of restitution and durability are as follows.

Test method (1) Coefficient of restitution

A stainless steel cylinder having a weight of 198.4 g was struck at a speed of 45 cm/sec against a golf ball using a compressed-air actuated resilience gun, and the velocity of the cylinder and the golf ball before and after the strike were measured using a phototube. The coefficient of restitution of the golf ball was calculated from the velocity and the weight of both the cylinder and the core. The larger the coefficient of restitution is, the more excellent the rebound characteristics are.

(2) Durability

After a No. 1 wood club (a driver) was mounted to a swing robot manufactured by True Temper Co., and a golf ball was hit at a head speed of 45 m/second to strike against an impact board placed 0.3 m ahead, repeatedly. The durability is the number of strike until the cover of the golf ball cracks, and is indicated by an index when that of Comparative example 1 is 100. When the number is more than 100, the golf ball has better durability than the golf ball of Comparative Example 1. The larger the number is, the better durability the golf ball has.

TABLE 4

| | Example No. | | Comparative Example No. | | |
|---|---|---|---|---|---|
| Test item | 1 | 2 | 1 | 2 | 3 |
| Ball weight (g) | 45.4 | 45.4 | 45.4 | 45.4 | 45.4 |
| Ball compression | 96 | 96 | 95 | 95 | 95 |
| Coefficient of restitution | 0.7865 | 0.7869 | 0.7841 | 0.7833 | 0.7823 |
| Durability | 120 | 118 | 100 | 98 | 95 |

As is apparent from the comparison of the physical properties of the golf balls of Examples 1 to 2 shown in Table 4 with those of the golf balls of Comparative Examples 1 to 3 shown there, the golf balls of the present invention (Examples 1 to 2) have larger coefficient of restitution and larger index indicating durability, that is, have better rebound characteristics and better durability than the golf balls of Comparative Examples 1 to 3. That is, the golf balls of Examples 1 to 2 using the cores vulcanized with zinc acrylates of Preparation 1 to 2 having a particle size distribution of 0.1 to 5 μm and an average particle size of 1 to 4.5 μm as described in Table 1 have larger coefficient of restitution and larger index indicating durability, that is, have better rebound characteristics and better durability than the golf balls of Comparative Examples 1 to 3 using cores vulcanized with zinc acrylates of Comparative Preparation 1 to 3 which one or both of a particle size distribution and average particle size are out of the above ranges.

What is claimed is:

1. A solid golf ball comprising a core and a cover formed on the core, the core being obtained by vulcanizing and molding a rubber composition, wherein the rubber composition contains as co-crosslinking agent zinc acrylate having a particle size distribution of 0.1 to 5 μm and an average particle size of 1 to 4.5 μm.

2. The solid golf ball according to claim 1, wherein the rubber composition comprises polybutadiene rubber, a weight adjusting agent, a vulcanization initiator and zinc acrylate having a particle size distribution of 0.1 to 5 μm and an average particle size of 1 to 4.5 μm.

3. The solid golf ball according to claim 1, wherein the zinc acrylate is prepared by reacting a zinc compound with acrylic acid.

4. The solid golf ball according to claim 3, wherein the zinc compound is zinc oxide.

5. The solid golf ball according to claim 3, wherein the reaction is conducted in an organic solvent with mixing in a mixer.

6. The solid golf ball according to claim 5, wherein the organic solvent is toluene, xylene or benzene.

7. The solid golf ball according to claim 3, wherein the zinc acrylate is coated with a metal salt of a higher fatty acid.

8. The solid golf ball according to claim 7, wherein the metal salt of higher fatty acid is zinc stearate.

* * * * *